United States Patent
Lee

(10) Patent No.: US 7,061,155 B1
(45) Date of Patent: Jun. 13, 2006

(54) ROTOR DEVICE CAPABLE OF DISSIPATING HEAT AND RESISTING FOREIGN OBJECTS

(75) Inventor: Ming-Che Lee, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/028,200

(22) Filed: Jan. 4, 2005

(51) Int. Cl.
*H02K 1/22* (2006.01)
*H02K 5/10* (2006.01)
*H02K 5/12* (2006.01)

(52) U.S. Cl. ............... 310/261; 310/88; 310/62; 417/373

(58) Field of Classification Search .......... 310/261, 310/88, 62, 63
See application file for complete search history.

(56) References Cited

U.S. PATENT DOCUMENTS

| | | | | |
|---|---|---|---|---|
| 4,682,065 A | * | 7/1987 | English et al. ............... 310/90 |
| 5,013,957 A | * | 5/1991 | Wrobel ......................... 310/217 |
| 5,170,086 A | * | 12/1992 | Wrobel et al. ............... 310/217 |
| 5,363,003 A | * | 11/1994 | Harada et al. ............. 310/67 R |
| 5,982,066 A | * | 11/1999 | Marracino et al. ............ 310/91 |
| 6,501,200 B1 | * | 12/2002 | Engel et al. .............. 310/68 R |
| 2005/0012416 A1 | * | 1/2005 | Huang et al. ................. 310/88 |

FOREIGN PATENT DOCUMENTS

KR 200304883 A * 5/2003

* cited by examiner

*Primary Examiner*—Darren Schuberg
*Assistant Examiner*—Erik Preston

(57) ABSTRACT

A rotor device capable of dissipating heat and resisting foreign objects includes a hub and a shield case. The hub has a closed wall and a hub wall connecting with the closed wall and the closed wall at least has a hub hole. The shield case is mounted in the hub and has an upper wall neighboring the closed wall and a circumferential wall connecting with the upper wall. The upper wall at least has a through hole offsetting the hub hole to allow the fluid passing through the hub hole and the through hole for performing heat dissipation and preventing the foreign objects from falling into the shield case via the hub hole and the through hole.

1 Claim, 4 Drawing Sheets

ROTOR DEVICE CAPABLE OF DISSIPATING HEAT AND RESISTING FOREIGN OBJECTS

BACKGROUND OF THE INVENTION

1. Field of the Invention

The present invention is related to a rotor device capable of dissipating heat and resisting foreign objects and particularly to a rotor assembly, which can remove heat generated from running of the rotor and prevent the foreign objects from falling into the rotor device.

2. Brief Description of the Related Art

Referring to FIG. 1, a conventional rotor assembly of a fan motor includes a shield case 11 and a hub 12, which is attached to the outer surface of the shield case 11. The shield case 11 has a top wall 111 and a lateral wall 112, which is integral with and extends downward from the top wall 111. The top wall provides a plurality of through holes 113. The hub 12 has a closed wall adjacent to the top wall 111 and a hub wall 122 adjacent to the lateral wall 112 and integral with the closed wall 121. Hub holes 123 are provided to align with the through holes 113 so that passages are formed to allow the fluid passing through. When a rotor 13 and a stator 14, which are mounted in the shield case 11 and the hub 12, rotate to generate heat, temperature of the fluid in the shield case 11 and the hub 12 rises and flows outward via the through holes 113 and the hub holes 123. Hence, the heat in the shield case 11 and the hub 12 can be dissipated to enhance the performance of the rotor 13 and the stator 14 and extend life span thereof.

Further, the shield case 11 is made of metal and the hub is made of plastics.

However, the preceding rotor assembly has a problem that foreign objects easily enter or fall into the shield case 11 through the hub hole 123 and the through holes 113 directly to affect internal operation.

Further, the shield case 11 can transmit heat generated from the rotor 13 and stator 14 but the plastic hub 12 provides much lower effect of heat transmission than the metal shield case 11, that is, the heat conductivity of the hub 12 is much lower than the shield case 11. Thus, the heat through the shield case 11 is incapable of being dissipated outward via the hub 12 effectively.

SUMMARY OF THE INVENTION

An object of the present invention is to provide a rotor device capable of dissipating heat and resisting foreign objects in which the through holes of the hub offset the through holes of the shield case to prevent the foreign objects from entering the rotor device and to allow the fluid moving in and out the rotor device for enhancing heat dissipation.

Another object of the present invention is to provide a rotor device capable of dissipating heat resisting foreign objects in which a gap is provided between the closed wall of the hub and the upper wall of the shield case to offer a space available for the fluid moving and result in natural convection between the hub and the shield case for assisting dissipation of heat in the shield case.

A rotor device capable of dissipating heat and resisting foreign objects according to the present invention includes a hub and a shield case. The hub has a closed wall and a hub wall connecting with the closed wall and the closed wall at least having a hub hole. The shield case is mounted in the hub with an upper wall neighboring the closed wall and a circumferential wall connecting with the upper wall. The upper wall at least has a through hole offsetting the hub hole to allow the fluid passing through the hub hole and the through hole for performing heat dissipation and preventing the foreign objects from falling into the shield case via the hub hole and the through hole.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
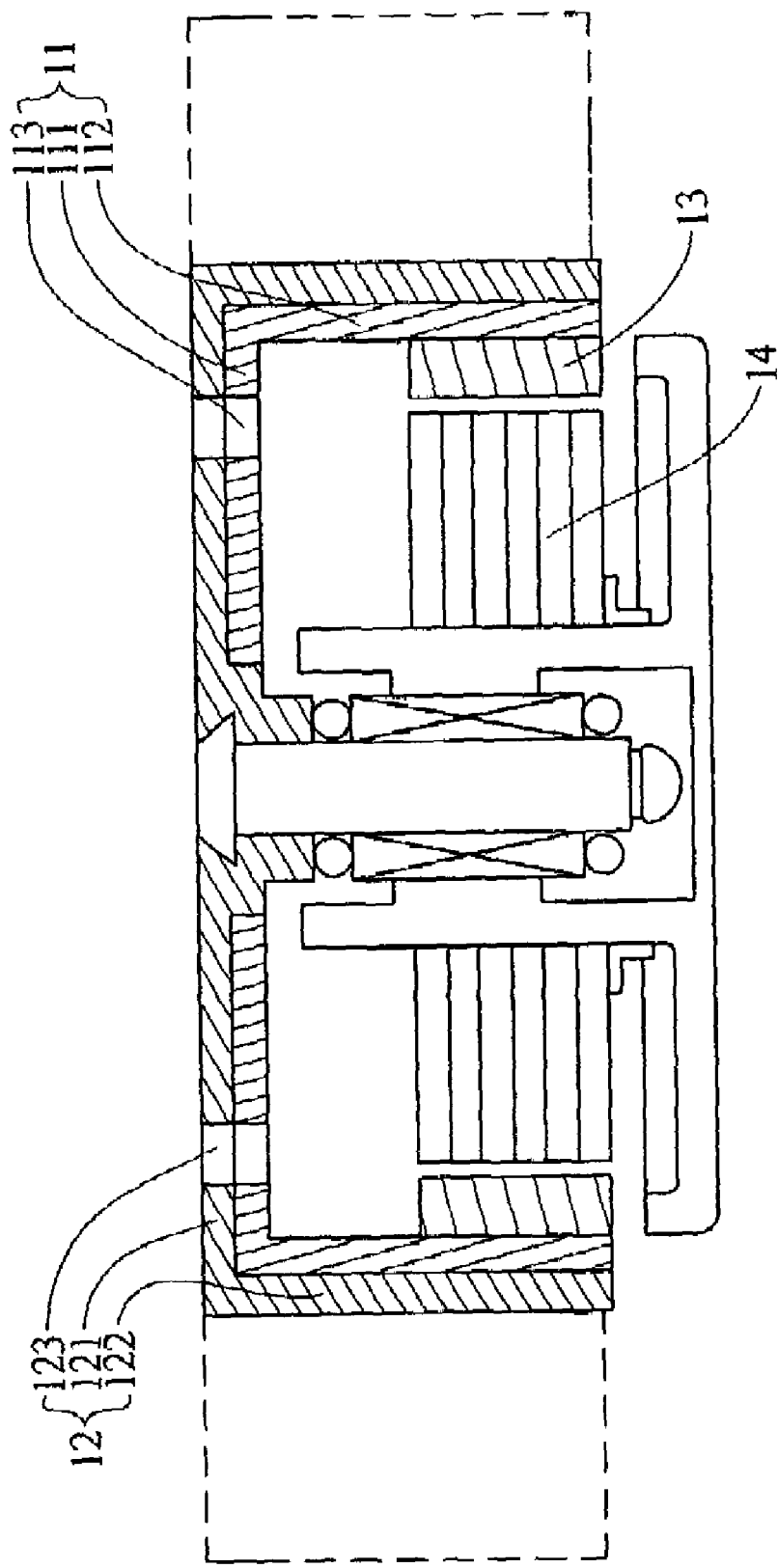
FIG. 1 is a sectional view of the conventional rotor assembly utilized in a fan motor.
Figure 2:
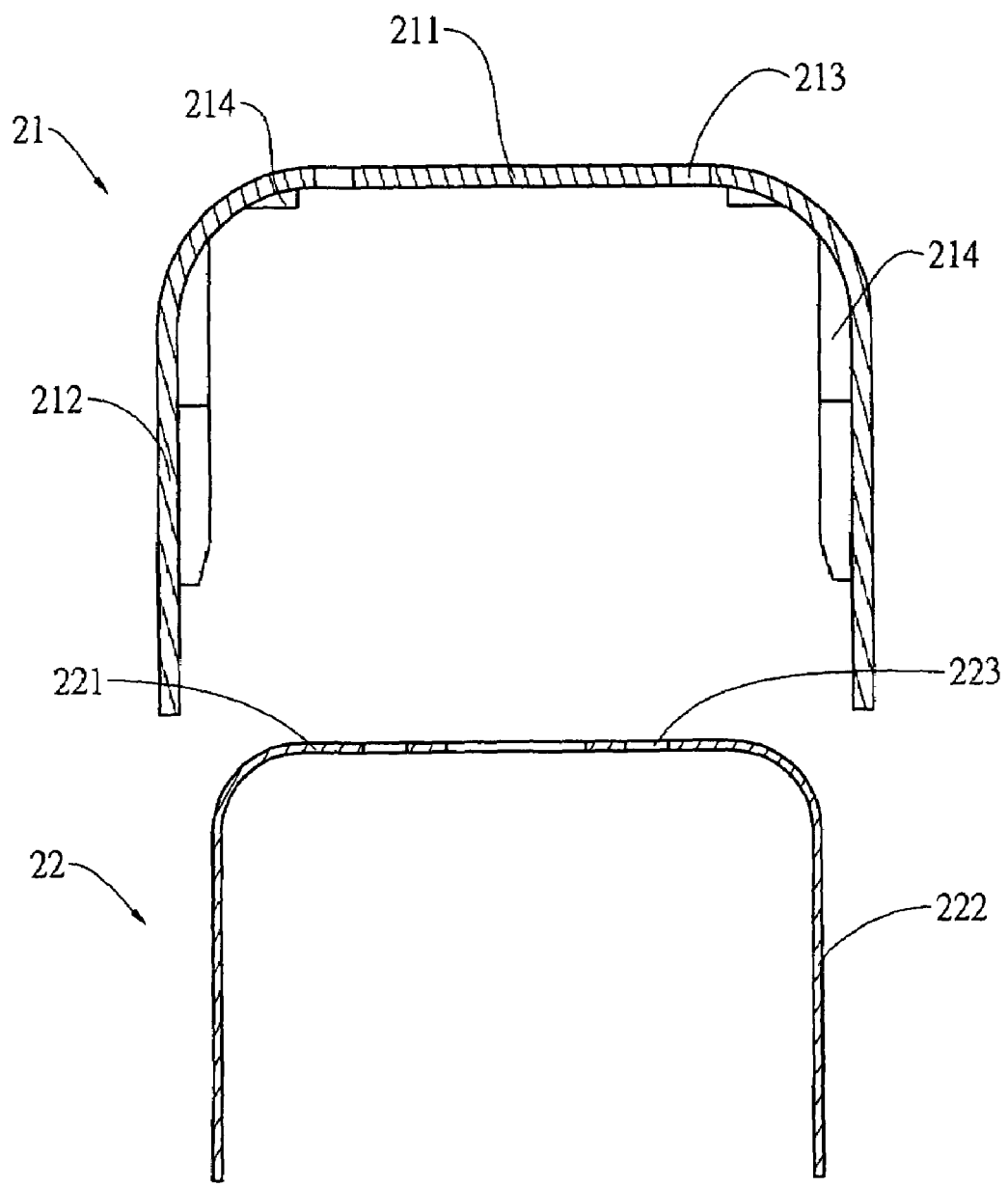
FIG. 2 is a sectional view of a preferred embodiment of a rotor device capable of dissipating heat and resisting foreign objects according to the present invention.
Figure 3:
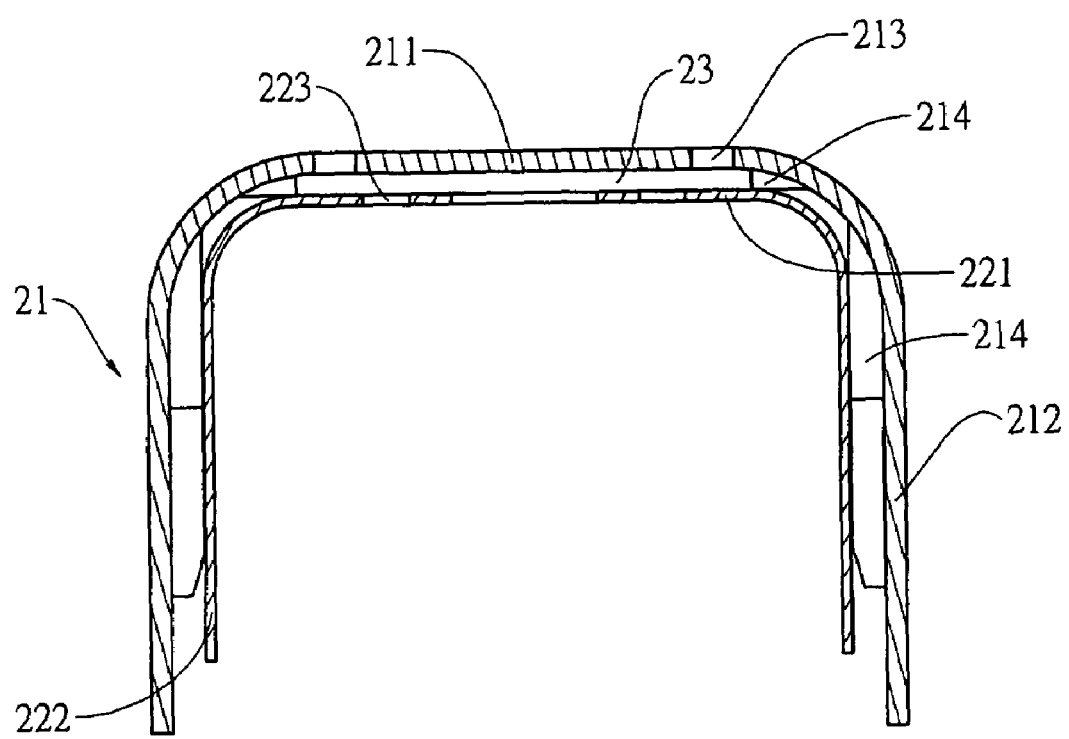
FIG. 3 is an assembled sectional view of FIG. 2.

Referring to FIGS. 2 and 3, the preferred embodiment of a rotor device capable of dissipating heat and resisting foreign objects according to the present invention comprises a hub 21 and a shield case 22. The hub 21 has a closed wall 211 and a hub wall 212, which extends downward from the closed wall 211. The closed wall 211 provides at least a hub hole 213 and there is a projection 214 at the closed wall 211 and the hub wall 212 respectively. The shield case 22 has an upper wall 221 and a circumferential wall 222 extending downward from the upper wall 221 and the upper wall 221 of the shield case 22 provides at least a through hole 223. The shield case 22 is attached to the inner side of the hub 21 in a way of the outer surface of the shield case 22 being covered with the hub 21 and the upper wall 211 and the circumferential wall 222 contacting with the projections 214. A gap 23 is formed between the closed wall 211 of the hub 21 and the upper wall 221 of the shield case 22 due to the projection 214 at the closed wall 211.

The hub hole 213 of the hub 21 is disposed to offset the through hole 223 of the shield case 22, that is, the hub hole 213 is not aligned with the through hole 223. Besides, the hub 21 is made of plastics and the shield case 22 is made of good heat conductive material such as metal. The hub 21 is joined to the shield case 22 with adhesive bond (not shown).

Figure 4:
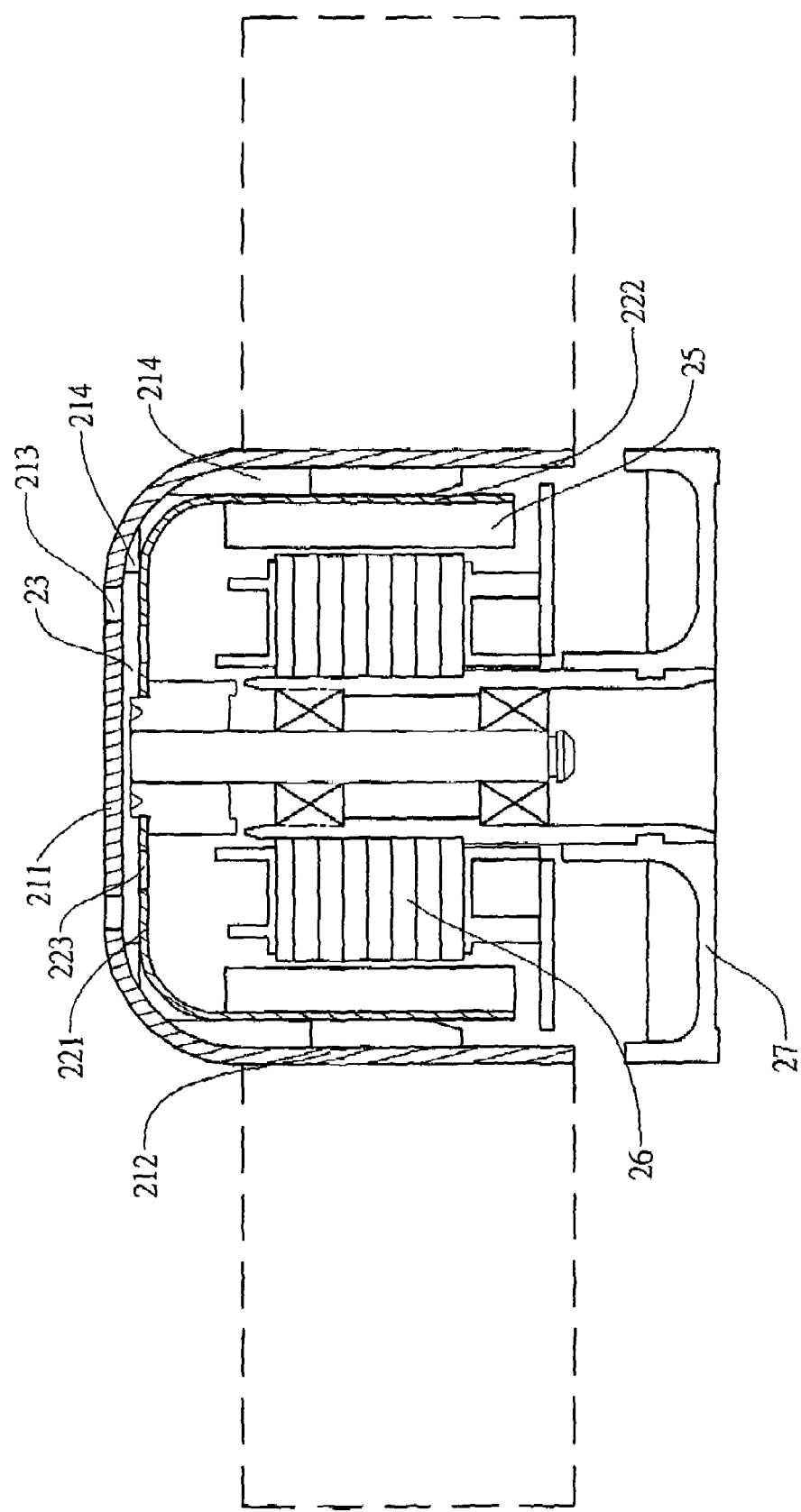
FIG. 4 is a sectional view illustrating the preferred embodiment of the present invention applied to a fan motor.

Referring to FIG. 4 in company with FIG. 2, the rotor 25 of the fan motor is attached to the inner surface of the circumferential wall 222 of the shield case 22 and the stator 26 of the motor is attached to a motor base 27 such that magnetic connection is formed between the stator 26 and the rotor 25. When the stator 26 and the rotor 25 are magnetized, the hub 21 and the shield case 22 are induced to rotate and to move fluid such that the created magnetic force comes along with heat due to physical change such that the fluid in the hub 21 and the shield case 22 rises temperature thereof and moves outward via the hub hole 213 and the through hole 223 to dissipate heat in the hub 21 and the shield case 22.

As the foregoing, the shield case 22, which is made of good heat conductive material, can transmit heat generated from rotations of rotor 25 and stator 26 and the fluid can move in the gap 23 to occur natural convection such that the fluid can flow outward through the hub 21 and the hub hole 213 to assist heat dissipation of the shield case 22. Further, the hub hole 213 offsetting the through holes 223 can prevent foreign objects from falling into the shield case 22 via the hub hole 213 and the through hole 223. The deficiency of the foreign objects entering the shield case 22 to affect rotations of the rotor 25 and the stator 26 can be overcome to enhance overall heat dissipation efficiency and extend life span of the rotor 25 and the stator 26.

While the invention has been described with referencing to preferred embodiments thereof, it is to be understood that modifications or variations may be easily made without departing from the spirit of this invention, which is defined by the appended claims.

What is claimed is:

1. A rotor capable of dissipating heat and resisting foreign objects, comprising:

a hub, having a closed wall and a hub wall extending downward from the closed wall and the closed wall at least having a first through hole;

a shield case, being disposed in the hub, having an upper wall and a circumferential wall extending downward from the upper wall and the upper wall at least having a second through hole;

characterized in that the closed wall of the hub is attached with at least a wedge shaped projection disposed at the inner side thereof near an intersection of the closed wall and the hub wall and the hub wall is attached with at least an elongated plate shaped projection at the inner side thereof and extending from the middle thereof to the intersection such that the wedge shaped projection contacts with the upper wall of the shield case and the elongated plate shaped projection contacts with the circumferential wall of the shield case to form a gap between the hub and the shield case; and the first through hole and the second through hole are arranged to misalign from each other.

\* \* \* \* \*